United States Patent Office 3,422,271
Patented Jan. 14, 1969

3,422,271
RADIATION SENSITIVE APPARATUS FOR THE PHOTOMETRIC ANALYSIS OF LIQUIDS
Hans Fuhrmann, Hamburg-Langhorn, Germany, assignor to Bran & Lübbe, Hamburg, Germany
Filed Sept. 30, 1963, Ser. No. 312,719
Claims priority, application Germany, Oct. 1, 1962, F 37,932
U.S. Cl. 250—218       2 Claims
Int. Cl. G01n *21/26;* G01n *21/00;* G01j *3/00*

ABSTRACT OF THE DISCLOSURE

An automatic device for colorimetric or turbidimetric analysis, or both, in which a servo-balanced photoelectric bridge comprises two servo-controlled balance impedances which can be varied independently of each other, and at least one of which is capable of retaining its most recent setting while the other balances the bridge. A program control is provided for dispensing a zeroing fluid to a cuvette positioned between one of the photocells of the bridge circuit and a light source for zeroing the device, and for dispensing samples of fluid to be tested to the same cuvette for analysis.

BACKGROUND OF THE INVENTION

In automatic colorimetric or turbidimetric analyzing apparatus of the prior art periodic zero-drift compensation is necessary to maintain the stability and sensitivity of the apparatus. During continuous operation of such apparatus extending, say, over several months, the amount or degree of opacity or color in the solution under test which is indicated by the apparatus to be zero (i.e., 100% transparent) is gradually altered by contamination which becomes deposited on the windows of the cuvettes.

In the electrical measuring instrument art, zero-drift compensation has been provided by comparing the instrument battery voltage with the voltage of a standard cell and automatically compensating for the aging of the instrument battery by means of an adjustable resistor. In this form of zero-drift compensation, the life of the standard cell is extended by only connecting it to be compared with the instrument battery voltage for brief intervals. The instrument battery voltage, on the other hand, is continuously compared with the input test voltage.

In order to reduce the effect of contamination of the cuvettes of colorimetric analyzing instruments, numerous expedients have been proposed, such as increasing the flow velocity of the medium being measured, mechanical cleaning during operation, or addition of suitable chemicals. These means, however, are inapplicable in the case of analyzing apparatuses which are intended to operate for long periods of time.

SUMMARY OF THE INVENTION

An object of the present invention is to obviate or mitigate certain disadvantages of prior art methods and devices by providing processes and apparatuses for the photometric analysis of liquids in the above-mentioned drift effects are automatically corrected and compensated, and which bring about a considerably increased measuring accuracy, even in the case of rapidly repeated series of measurements.

In automatic analyzing apparatus according to the present invention, measured quantities of a reagent and a test liquid are dispensed by means of a program control into a mixing container for the purpose of preparing a zeroing fluid, and this fluid is then transferred from the mixing container into an analyzing and zeroing cuvette for the photoelectric determination and storage of a zero value corresponding to the absolute transmissivity of the zeroing fluid. After draining the analyzing and zeroing cuvette, measured quantities of reagent and test liquid are introduced into the mixing container to prepare a sample fluid to be tested, whereupon the sample fluid is transferred to the analyzing and zeroing cuvette and there photometrically compared with the stored zero value of the zeroing fluid.

In the mixing container, in a first step, measured quantities of a solution of an oxidizing or reducing medium or a complex-forming substance and a neutral or colored coloring component capable of a variable color change by oxidation or reduction are combined with a test fluid for dilution to the total volume of the corresponding measuring cuvette and combined to form a zeroing fluid which is then transferred to the analyzing and zeroing cuvette for determination and storage of the zero value. In a second step, sample fluid prepared in the mixing container from the test liquid, the color solution and the oxidation of reduction solution is transferred to the analyzing and zeroing cuvette, which has been drained of zeroing fluid, for testing. The resulting measured value of the sample fluid may then be photometrically compared with the stored zero value.

The determination of the zero value may be performed by means of the zeroing fluid before each test of a sample, or before a series of such tests.

In the continuous analysis of colored or turbid solutions, zeroing fluid may be passed through the analyzing and zeroing cuvette at selected time intervals, at which intervals the contamination which has occurred in the analyzing and zeroing cuvette is compensated for.

To determine the turbidity of colored and turbid solutions in which the color varies with chemical properties, according to the present invention, the sample fluid may be passed at determined time intervals through a filter to remove the turbidity, producing a clear zeroing fluid. The color value of this zeroing fluid is then determined as a zero or reference value and compared with the measured value obtained for the turbid solution as indicated above.

Devices according to the present invention may also employ the well-known reference photocells and reference cuvettes of the prior art, although this is not a part of the present invention.

Other objects of the invention will in part be obvious and will in part appear hereinafter.

The invention, accordingly, comprises the features of construction, combinations of elements, and arrangements of parts, which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

*Description of the preferred embodiments*

Figure 1:
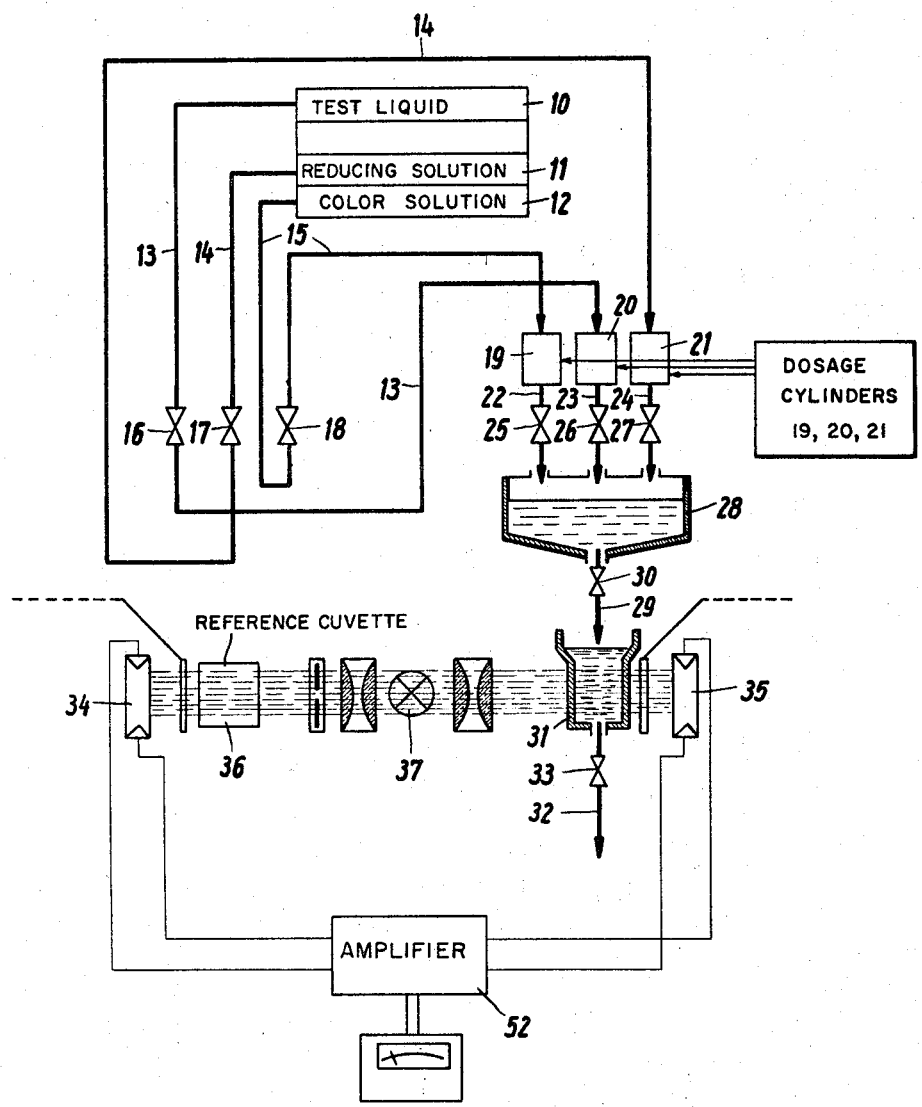
FIG. 1 shows diagrammatically a device for the automatic dispensing of a reagent and a test liquid, along with measuring means.

Apparatus for operating the method according to the invention comprises, according to FIG. 1, a stock container 10 for the liquid to be tested. The liquid may, for instance, be drawn directly from the feed-water tank of a steam boiler. Stock containers 11, 12 for reagents are provided according to the particular method of analysis to be used. The stock containers 10, 11, 12 are connected by pipelines 13, 14, 15 through stopcocks 16, 17, 18, to dosage cylinders 19, 20, 21 from which feed pipes 22, 23, 24 with stopcocks 25, 26, 27 lead to a mixing chamber 28. This mixing chamber 28 is connected by a pipe 29 and a stopcock 30 with a measuring cuvette 31 of a photoelectric measuring system. The measuring cuvette 31 has a drain 32 controlled by a stopcock 33 which is controlled electromagnetically, in the same way as the cocks 16, 17, 18 and 25, 26, 27, by a programming unit.

Photoelectric cells of the photoelectric measuring system are shown at 34, 35. They are connected in a bridge circuit hereinafter described in connection with the operation of this method. A reference cuvette 36 can be placed additionally in the path of rays from a light source 37 of the photoelectric measuring system.

An example of the method of the invention and operation of the apparatus shown in FIG. 1 is the determination of the silicic acid content of a liquid using the molybdenum blue test. The liquid to be tested is drawn from the stock container 10 while, a reducing solution is taken from the container 11. An ammonium molybdate solution is drawn from the container 12. These are passed through the cocks 16, 17, 18 into the dosage cylinders 19, 20, 21. Firstly, the reducing solution and the ammonium molybdate solution are introduced into the mixing chamber 28, in which the two solutions react with each other, in order to detect any traces of silicic acid which may be present in these reagents. On completion of this reaction, the test liquid from the dosage cylinder 20 is added to the reaction solution already contained in the mixing chamber 28. The silicic acid contained in the test solution does not react. Any blue coloration which occurs will be due to slight traces of silicic acid present in the reagents. The addition of test liquid is performed only to dilute the solution to a volume corresponding to the capacity of the measuring cuvette 31, and has no positive influence on the zero value of the reagents.

From the mixing chamber 28 the solution flows through a stopcock 30, which together with the other cocks in the apparatus is time-controlled by a conventional programming drum, into the measuring cuvette 31. The pair of control leads extending between each of said cocks and its corresponding pair of programming drum terminals is indicated only by labelling the pair of drum terminals (FIG. 2) corresponding to a particular cock with the reference numeral of the cock primed and doubleprimed, respectively, e.g., program drum terminals 30' and 30" (FIG. 2) may be understood to be connected directly to the terminals of cock 30. This convention is further illustrated by the leads 58' and 58" of relay 58, which are shown in full in FIG. 2. At the same time the dosage cylinders 19, 20, 21 are charged with ammonium molybdate solution, test solution, and reducing solution respectively. Secondly, after draining the mixing chamber 28 and closing the stop cock 30, ammonium molybdate solution and test solution are passed into the mixing chamber 28 to form a silicon-molybdate complex, after which the reducing solution is introduced into the same mixing chamber.

During these first and second parts, the simultaneously activated photoelectric cells 34, 35 determine the colour tone formed by the chemical reaction of the reducing solution with the ammonium molybdate solution. The apparatus is zeroed using the solution introduced in the first step and then, the measuring cuvette 31 is drained. The reaction solution prepared in the second step in the mixing chamber 28, from the test solution, ammonium molybdate solution and reducing solution, is passed into the drained measuring cuvette 31. The measured-value determination of this solution in the measuring cuvette 31 proceeds by means of the two photoelectric cells, 34, 35 in a differential technique, as a part of which switches 55, 56, and 57 are thrown by solenoid 58 (FIG. 2) under the control of the abovesaid conventional programming drum. The difference of the colour tones of the solutions provides a direct measure of the concentration of the silicic acid.

Instead of a simultaneous preparation of the zero-value solution and the measured solution within a single measuring cycle of about 12 minutes, the measured values of the two solutions can alternatively be determined in succession, i.e. at longer time intervals. It is, however, also possible to perform the zero value determination for instance after each third or fifth measurement, as a correction.

Additionally, between two measuring operations, the apparatus may be rinsed or washed. Cleaning agents are then usefully added to a washing liquid.

Figure 2:
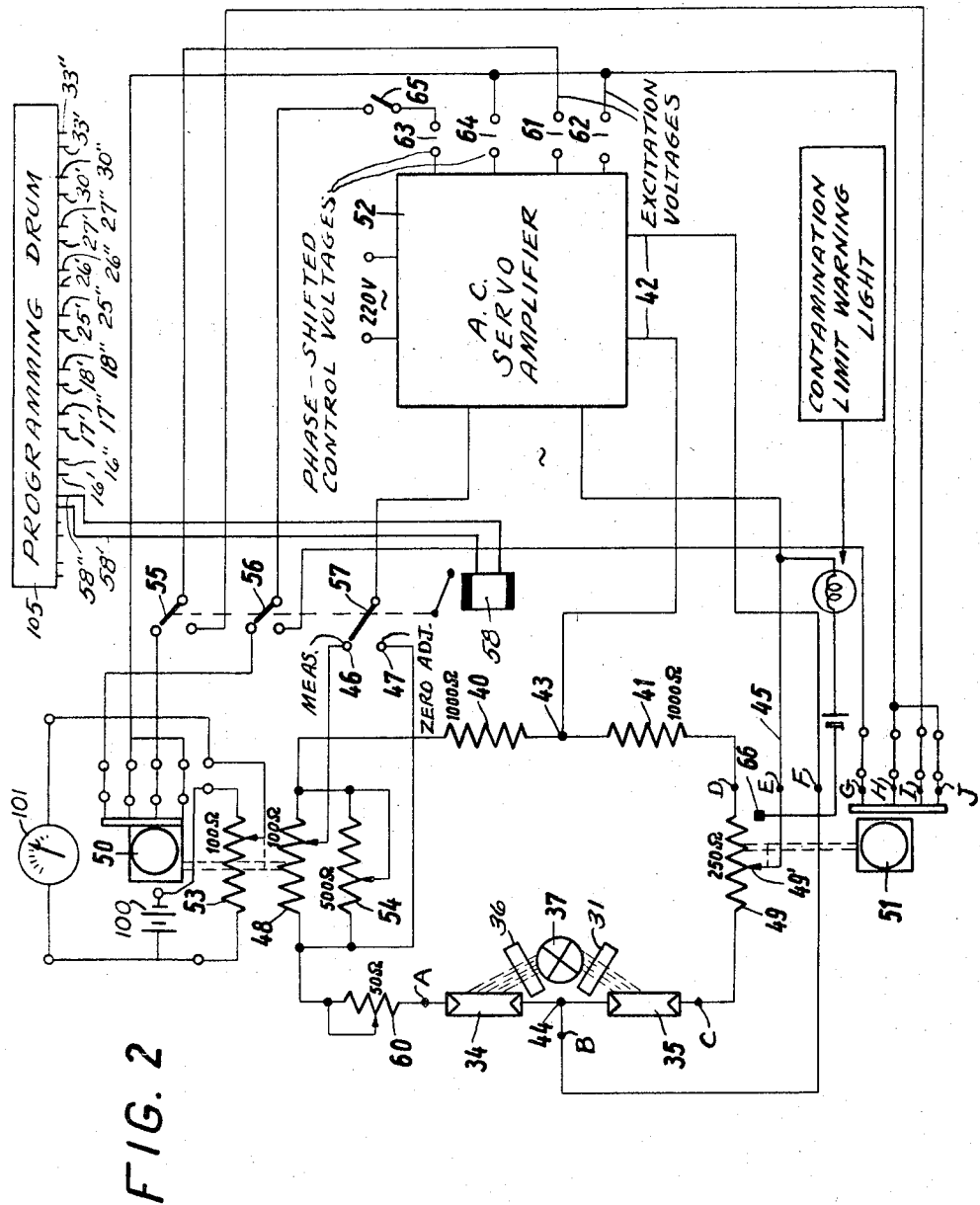
FIG. 2 shows a circuit diagram of a device according to the invention.

The electrical determination of the zero and measured values is performed with automatic compensation by means of a bridge circuit shown in FIG. 2. The essential component of this circuit is a Wheatstone bridge circuit comprising third and fourth resistors 40, 41 and the two photoelectric cells 34, 35, of which the photoelectric cell 34 is illuminated through the reference cuvette 36, while the photoelectric cell 35 receives light through the measuring cuvette 31. The light source is shown at 37.

The bridge potential 42, in this particular case, an alternating voltage, is applied to the bridge at 43, 44. The voltage of the bridge circuit is tapped on the diagonal at 45, 46 or 45, 47.

48, 49 denote potentiometers which are preferably driven by two phase induction servo motors 50, 51, which act as setting motors, and receive their alternating voltage from a reversible compensating transistor amplifier 52. The zero potentiometer 49 is used for automatic zero-point compensation. It is adjusted during the zero value measurement by the setting motor 51.

The tapping point of the measuring potentiometer 48 which is mechanically coupled with a potentiometer 53, occupies the position "left stop" for a light permeability of 100%, or zero extinction, of the two cuvettes 31, 36; while the "right stop" position represents full deflection, which can be regulated according to the required sensitivity in the measuring range, by a potentiometer 54. Potentiometer 53 has voltage 100 across it and shows its adjustment on voltmeter 101.

The switches 55, 56, 57 are controlled by a relay 58.

The manner of operation of the electronic component of the measuring apparatus represented in FIG. 2, is as follows:

When determining the zero value or zero setting, the measuring potentiometer 48 is set by means of the servo motor 50, to the position "left stop," while the zeroing potentiometer 49 is set approximately to a middle position (FIG. 2).

For the purpose of measurement, a 100% transparency of the measuring and reference cuvettes 31, 36 is assumed. At the instant of the measurement the amplifier 52 is connected to points 45 and 46, and switches 55 and 56 are closed through their upper fixed contacts, completing a first servo loop through induction motor 50. If the measuring cuvette contains a test liquid with less than 100% permeability the balance of the bridge is altered. This balance is restored by means of the two-phase induction setting motor 50 which rotates the poentiometer 48 to the right. The compensating amplifier 52 in this case represents a multistage unit with a choke output, producing a phase-shift between an exciter voltage 61, 62 and an amplified A.C. output 63, 64. Such two-phase induction motors and associated amplifier circuits have long been known to those having ordinary skill in the art, as shown, for instance, at pp. 2–79 through 2–91 of Basic Synchros and Servomechanisms, Van Valkenburgh, Nooger, and Neville, Inc., John F. Rider, Publishers, Inc., New York, 1955. A.C. servo amplifier 52, of course, includes two such circuits, one to control induction motor 50 and one to control induction motor 51.

In the "zero point adjustment" position, the amplifier input is connected to points 45, 47, and a second, or zeroing, servo loop is completed through induction motor 51 by the simultaneous switching of switches 55 and 56, all carried out by solenoid 58. The transistor amplifier 52 is in direct connection with the bridge and the zero-point potentiometer 49. The tapping point 47 then corresponds to the zero point of the measuring potentiometer 48, i.e. "left-hand stop." The measured-value setting of the potentiometers 48 and 53 is thus retained during adjustment. The indicated value is indicated by a voltmeter 101 in a conventional manner. A conventional recorder, such as described in Chapter X of Electrical Measurements, Frank A. Laws, McGraw-Hill Book Company, 1938, may be used instead of, or in addition to, voltmeter 101.

If the zero value of the measuring cuvette 31 changes, for instance by contamination, the setting motor 51 energized from the amplifier output, again balances the bridge by means of the potentiometer 49. After restoration of equilibrium of the bridge the zero-value solution prepared in the first stage of the method is drained from the measuring cuvette 31 and the solution prepared in the second stage, is introduced, and the amplifier 52 is simultaneously connected with 45, 46. If the silicic acid concentration of this solution has not changed from the previously measured zero value, the measuring potentiometer 48 retains its original setting. If the silicic acid concentration has changed however the potentiometer resets to this new value. The two setting motors 50, 51 are switched to the amplifier output at a suitable instant, i.e. after the reactions in the solutions are completed, through the switch 65.

In the case of contamination of the measuring cuvette, the consequent displacement of the zero point can be used to actuate an optical or acoustic signal device. The deflecting tap 49' of the zero-point potentiometer 49 then influences a signal element shown diagrammatically on the drawing at 66 (FIG. 2). When the signal element 66 responds, this indicates that it is necessary to clean the measuring cuvette or wash out the apparatus.

Figure 3:
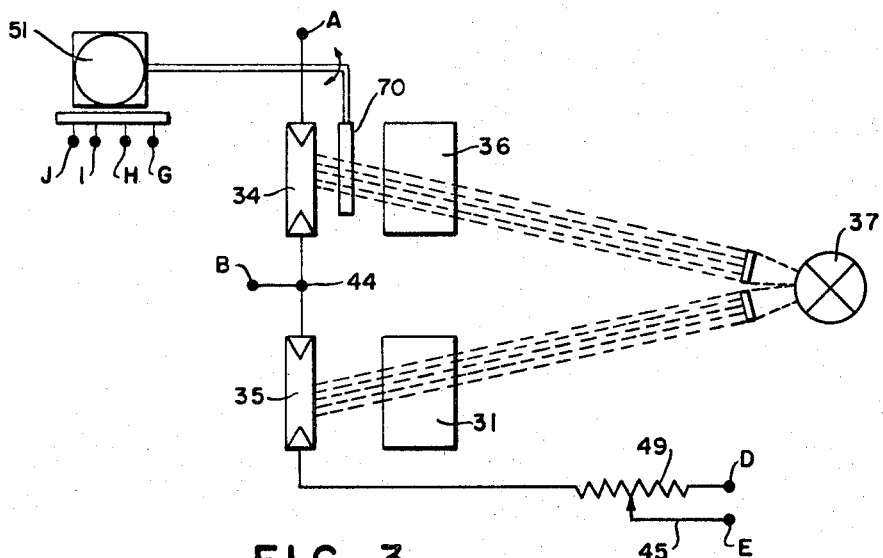
FIG. 3 shows an embodiment of the invention in which a diaphragm stop in the path of rays from a light source in a photoelectric measuring system is used for balancing.
Figure 4:
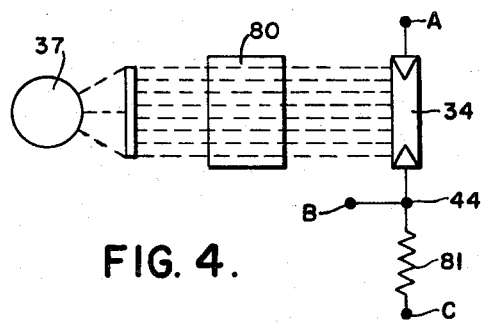
FIG. 4 shows a measuring arrangement with a single photoelectric cell.
Figure 5:
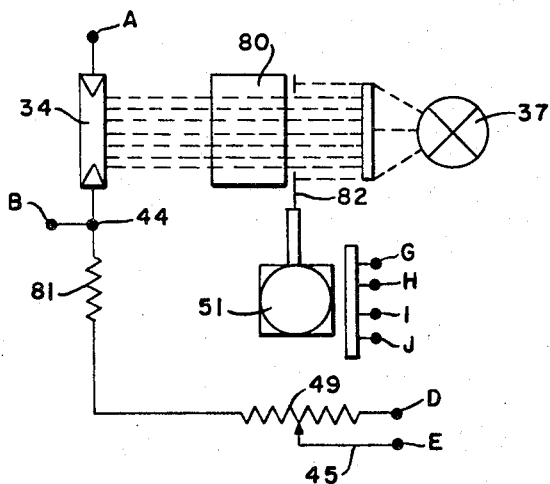
FIG. 5 shows a corresponding measuring arrangement as in FIGURE 4 but with a diaphragm stop interposable in the path of the rays from the light source of a photoelectric measuring system.

The embodiments of FIGS. 3, 4, and 5 differ from the embodiment of FIG. 2 only as specifically indicated in FIGS. 3, 4, and 5, respectively. Thus, the embodiment of FIG. 3 constitutes the circuit of FIG. 2 from which the elements connected between terminals A, B, D, and E have been removed, these elements being replaced by the elements shown in FIG. 3, terminals A, B, D, and E of FIG. 3 being connected to terminals A, B, D, and E of FIG. 2, respectively. The interconnections of servo motor 51 with AC servo amplifier 52 remains unchanged from that shown in FIG. 2, the terminal designations J, I, H, and G being arbitrarily adopted to promote clarity of the drawings. As will be evident to those having ordinary skill in the art, potentiometer 49 of FIGS. 3 and 5 is suitable for manual adjustment, and not servo-driven as in FIGS. 2 and 4. The nature of the complete circuits of FIGS. 4 and 5 may be determined by similar substitution.

In an embodiment represented in FIG. 3, a diaphragm 70, between the reference cuvette 36 and the correspsonding photoelectric cell 34, is used to balance the zero-point potentiometer. This diaphragm is swung by the setting motor 51 into the path of the rays from the source of light 37. If contamination takes place in the cuvette 31, the measuring bridge becomes unbalanced when the bridge circuit is switched to its zeroing mode of operation by the programming drum and solenoid 58. In so switching the bridge circuit solenoid 58 switches the moving contact arm 57 to its lower associated fixed contact 47, and also moves the contact arms 55 and 56 to their lower fixed contacts, thus energizing servo motor 51. At the same time the programming drum causes the reference cuvette 36 and the measuring cuvette 31 to be filled with "zeroing liquid," as described above. The setting motor 51 then displaces the diaphragm 70, i.e. moves it farther into the path of the rays of the light source 37, until the equilibrium of the bridge is restored. After balancing the bridge, the zero-value solution is drained from the measuring cuvette 31, and the test liquid is introduced. The amplifier input and output are switched to "measurement"—the switch 57 set to the contact 46, and the switches 55 and 56 to their upper contacts, thus energizing servo motor 50.

Instead of a photoelectric measuring system comprising two cuvettes 31, 36 and two photoelectric cells 34, 35 arranged in a Wheatstone bridge, a further embodiment as shown in FIG. 4, utilises a single cuvette 80 both for measurement and for reference. The cuvette 80 is associated with a photoelectric cell 34, while the photoelectric cell 35 is replaced by a fixed resistor 81. The zero-point potentiometer 49 is controlled by the setting motor 51, and the measuring potentiometer 48, by the setting motor 50. During the measurement, the liquid to be measured flows through the measuring-reference-cuvette 80. For zero-point compensation, the "zeroing liquid" is passed through the cuvette 80. The input of the amplifier 52 is set to "zero point," i.e. the switch 57 is set to the contact 47. In case of contamination of the cuvette 80, the zero-point potentiometer 49 is balanced by the setting motor 51, and the equilibrium of the bridge thus restored. On completion of the adjustment the cuvette 80 is filled with the measuring liquid and the input and output of the amplifier switched to "measurement"—the switch 57 being set to the contact 46, and the switches 55 and 56 to their upper contacts 72.

In an embodiment shown in FIG. 5 instead of electrical-zero-point adjustment of the zero-point potentiometer 49, a diaphragm 82 is fitted in front of the measuring-reference-cuvette 80 in the path of the rays from the light source 37. The diaphragm 82 is actuated by the setting motor 51 to restore the bridge balance in case of contamination of the cuvette 80.

In addition to silicic acid determination the present zero-value adjustment method can also be used for other analytical measurements as shown in the following examples:

*Example 1*

For the determination of hydrazine with p-dimethylamino-benzaldehyde, persulphate as an oxidising agent is added to the p-dimethylaminobenzaldehyde for zero value and zero-point measurement. The resultant reaction product is then diluted with water to the required volume.

It is, however, also possible to remove the hydrazine from the test liquid before the zero-value measurement. The test liquid is for this purpose passed through an activated-carbon filter.

*Example 2*

The determination of phosphate starts with an ammonium molybdate and a reducing solution, and for the zero-point measurement oxalic acid is added to destroy the complex formed. The reaction solution is then diluted with water.

*Example 3*

In chlorine analysis the zero-point measurement is made with dimethyl-p-phenyldiamine-hydrochloride and sodium sulphite as the reducing solution; after the reaction water is added to dilute the resulting reaction solution.

It is also possible to apply the zero-point adjustment method for instance for cuvettes contaminated by reagents and the like, and with turbid solutions, as explained in the following examples:

*Example 4*

For the continuous measurement of coloured or turbid solutions a zero-point measurement can be intermittently controlled for instance by time switches, and can be interposed at specified intervals in the continuous measuring process. In this case, magnetically-controlled valves are used to pass the zero-value solution for a certain time through the measuring cuvette. The deviations due to contamination are thereupon compensated.

*Example 5*

To measure the turbidity of coloured and turbid solutions the colour value of which however does not vary, the turbid solution is at fixed intervals passed through a filter to remove the turbidity. During this period, the colour value of the pure solution is determined, suitably recorded, and compensated. Thereupon, the turbidity of the solution is determined. The difference value then directly shows the degree of turbidity, but independently of the coloured solution.

From the aspect of measuring technique this gives the advantage that by means of automatic zero-value compensation very accurate and sensitive measurements can be made even in the lowest measuring ranges. The method according to the invention and the electrical equipment specially developed for this purpose, further enables the elimination and compensation of temperature errors, contamination in the measuring cuvettes, and deflections of the zero values, thereby obtaining accurate results even in the case of the least distinguishable traces.

It will thus be seen that the object set forth above, among those made apparent from the preceding description, is efficiently attained, and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:
1. Automatic analyzing apparatus, comprising:
   bridge circuit means including photocell means, light source means, and first and second variable balancing impedance means;
   first servo loop means for varying the impedance of said first variable balancing impedance means, said first servo loop means deriving an error signal from said first variable balancing impedance means;
   second servo loop means for varying the impedance of said second variable balancing impedance means, said second servo loop means deriving an error signal from said second variable balancing impedance means;
   selecting means for selectively enabling one of said servo loop means at a time to vary the impedance of its associated variable balancing impedance means, the other one of said variable balancing impedance means remaining set at the impedance value at which it was previously set by its associated servo loop means;
   a single combined analyzing and zeroing cuvette means for maintaining fluid in a light path between said light source means and said photocell means;
   fluid dispensing means operatively connected to said cuvette means;
   and program control means controlling said fluid dispensing means for successively dispensing specimens of sample fluid to said single combined analyzing and zeroing cuvette means for analysis, and for intermittently dispensing quantities of zeroing fluid to said single combined analyzing and zeroing cuvette means for zeroing said bridge circuit means.

2. Automatic analyzing apparatus as claimed in claim 1 in which said program control means also controls said selecting means to cause said first servo loop means to be operative when sample fluid is in said single combined analyzing and zeroing cuvette means, and to cause said second servo loop means to be operative when zeroing fluid is in said single combined analyzing and zeroing cuvette means.

References Cited

UNITED STATES PATENTS

| | | | |
|---|---|---|---|
| 2,806,148 | 9/1957 | Barton | 250—218 |
| 2,834,247 | 5/1958 | Pickels | 250—218 X |
| 2,872,588 | 2/1959 | Barton | 250—210 |
| 2,960,910 | 11/1960 | Pelavin | 88—14 X |
| 3,088,035 | 4/1963 | Neil | 250—210 |

WALTER STOLWEIN, *Primary Examiner.*

U.S. Cl. X.R.

88—14; 23—253